(12) United States Patent
Taftaf et al.

(10) Patent No.: US 7,189,674 B2
(45) Date of Patent: Mar. 13, 2007

(54) SUPPORTED CATALYST COMPOSITION FOR POLYMERIZATION OF OLEFINS, METHOD FOR PREPARING THE SAME AND PROCESS FOR POLYMERIZATION USING THE SAME

(75) Inventors: Mansour I. Taftaf, Riyadh (SA); Serajudin F. Ahmed, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 7 days.

(21) Appl. No.: 10/468,194

(22) PCT Filed: Feb. 7, 2002

(86) PCT No.: PCT/IB02/02761

§ 371 (c)(1),
(2), (4) Date: Feb. 17, 2004

(87) PCT Pub. No.: WO02/081531

PCT Pub. Date: Oct. 17, 2002

(65) Prior Publication Data

US 2004/0132611 A1   Jul. 8, 2004

(30) Foreign Application Priority Data

Feb. 15, 2001  (EP)  .................. 02000140

(51) Int. Cl.
*B01J 31/00* (2006.01)
*C09D 201/00* (2006.01)
*C08G 63/48* (2006.01)

(52) U.S. Cl. .............. 502/103; 502/102; 502/150; 502/104; 502/172; 525/21; 106/169.43

(58) Field of Classification Search ............ 502/150, 502/102, 103, 104, 172; 525/21; 106/169.43
See application file for complete search history.

(56) References Cited

U.S. PATENT DOCUMENTS

| 4,147,664 | A | | 4/1979 | Lisitskaya | |
|---|---|---|---|---|---|
| 4,303,771 | A | | 12/1981 | Wagner | |
| 4,389,334 | A | | 6/1983 | Weinert | |
| 4,477,639 | A | | 10/1984 | Nielsen | |
| 4,806,630 | A | * | 2/1989 | Drent et al. | 528/392 |
| 5,102,841 | A | | 4/1992 | Cann | |
| 5,173,540 | A | | 12/1992 | Saito | |
| 5,244,855 | A | | 9/1993 | Morini | |
| 5,252,654 | A | * | 10/1993 | David et al. | 524/414 |
| 5,275,993 | A | | 1/1994 | Fujita | |
| 5,420,313 | A | * | 5/1995 | Cunnington et al. | 549/529 |
| 5,744,414 | A | * | 4/1998 | Jenny | 502/103 |
| 5,902,916 | A | * | 5/1999 | Ruhl et al. | 585/266 |
| 6,153,551 | A | * | 11/2000 | Kissin et al. | 502/110 |
| 6,156,844 | A | * | 12/2000 | Hashimoto et al. | 525/240 |
| 6,235,845 | B1 | * | 5/2001 | Yamauchi et al. | 525/191 |
| 6,281,302 | B1 | | 8/2001 | Naga | |
| 6,303,696 | B1 | * | 10/2001 | Ushioda et al. | 525/240 |
| 6,432,861 | B1 | * | 8/2002 | Breitscheidel et al. | 502/103 |
| 6,495,484 | B1 | * | 12/2002 | Holtcamp | 502/152 |
| 6,800,581 | B2 | * | 10/2004 | Ledford et al. | 502/103 |

FOREIGN PATENT DOCUMENTS

| DE | 19829198 | 1/1999 |
|---|---|---|
| EP | 0506073 | 9/1992 |
| EP | 0523879 | 1/1993 |
| EP | 0604401 | 6/1994 |

* cited by examiner

*Primary Examiner*—J. A. Lorengo
*Assistant Examiner*—Veronica Faison-Gee
(74) *Attorney, Agent, or Firm*—William J. Spotz; Jim Wheelington

(57) ABSTRACT

Supported catalyst composition for polymerization of olefins comprising: (i) a titanium compound, a magnesium compound and at least one electron donor compound; (ii) an oxygen containing polymer support; and (iii) a cocatalyst comprising at least one aluminum compound.

26 Claims, No Drawings

SUPPORTED CATALYST COMPOSITION FOR POLYMERIZATION OF OLEFINS, METHOD FOR PREPARING THE SAME AND PROCESS FOR POLYMERIZATION USING THE SAME

FIELD OF THE INVENTION

The present invention relates to a supported catalyst composition for polymerization of olefins, a method for preparing the same and a process for polymerization using the same.

DESCRIPTION OF THE PRIOR ART

Supported heterogeneous catalyst compositions for the polymerization of olefins are well known in the art.

In many cases, silica supported titanium based catalysts have been used for the polymerization of olefins. However, their use does result in the presence of impurities in the final product. These impurities, in turn, cause the polymer to have an poor film appearance rating. Thus, while silica supported catalysts provide good particle morphology, a sacrifice is made in the quality of the polymer.

Therefore, a need existed to provide catalyst supports overcoming the drawbacks of using silica.

L. Sun, C. C. Hsu and D. W. Bacon, Journal of Polymer Science: Part A Polymer Chemistry, Vol. 32, 2127–2134, describe eleven polymers of different backbone structures and functional groups which are tested for their suitability for use as a catalyst support.

U.S. Pat. No. 5,102,841 discloses the use of polypropylene polymer as support to bond particulate of catalyst precursor based on titanium or vanadium. A catalyst preparation is used therein for a catalyst precursor which is already described in U.S. Pat. No. 4,303,771. In U.S. Pat. No. 5,102,841 a process for the production of polyethylene is disclosed utilizing a catalyst having a support which furnishes a particle morphology equivalent to silica and other organic oxide supports, but essentially avoids the presence of objectionable residue in the resin. The process of U.S. Pat. No. 5,102,841 comprises contacting ethylene or a mixture comprising ethylene and one or more alpha-olfins and, optionally, one or more diolefins, under polymerization conditions with a catalyst system comprising:

(a) a particulate catalyst precursor containing titanium and/or vanadium.
(b) polypropylene support particles to which the catalyst precursor particles are bonded; and
(c) a hydrocarbyl aluminum cocatalyst.

However, use of the process of U.S. Pat. No. 5,102,841 will result in a low productivity for that catalyst composition. Moreover, a product clarity and resin morphology are obtained which are not satisfying. Further, the catalyst price is quite high.

SUMMARY OF THE INVENTION

It is an object of the present invention to provide a supported catalyst composition, which overcomes the drawbacks of the prior art, especially improving its productivity.

It is a further object of the present invention to provide a method for preparing such a supported catalyst composition with lower costs.

It is still a further object of the present invention to provide a process for polymerization of olefins utilizing the supported catalyst composition of the present invention producing a polymer having an improved product quality and morphology.

The present invention provides a supported catalyst composition for polymerization of olefins comprising:

(i) a titanium compound, a magnesium compound and at least one electron donor compound;
(ii) an oxygen containing polymer support; and
(iii) a cocatalyst comprising at least one aluminum compound.

Moreover, the present invention provides a method for preparing a supported catalyst composition according to the present invention comprising the following steps:

(i) forming a catalytic precursor comprising a magnesium compound, a titanium compound and at least one electron donor compound;
(ii) mixing the catalytic precursor prepared in step (i) with a polymer support in a solvent;
(iii) refluxing the mixture prepared in step (ii) for a certain period of time;
(iv) optionally removing the solvent to form a solid powder of the supported catalyst composition; and
(v) adding a cocatalyst comprising at least one aluminum compound.

Further, the present invention provides a process for homopolymerization of ethylene or copolymerization of ethylene with alpha-olefins and/or diolefins by contacting ethylene or ethylene and alpha-olefins and/or diolefins with a catalyst composition according to the present invention.

Surprisingly, it was found that a supported catalytic composition according to the present invention shows an increased productivity in the polymerization of olefins and has a low price in preparation. Moreover, the polymeric support will result in less product ash and in less catalyst residuals remaining in the polymer produced. Further, the properties concerning the polymer produced with the catalyst composition of the present invention show increased product clarity and resin morphology. Without wishing to be bound to any theory, the functionality of the polymeric support of the present invention seems to play a major role in anchoring or coordinating the catalyst precursor on the support surface and preventing precursor leaching which in turn would lead to form poor resin morphology as with polypropylene supports of the prior art.

DETAILED DESCRIPTION OF THE INVENTION

The catalyst precursor, in solid or dissoluted form, used in the present invention may be in principle identical to the one disclosed in U.S. Pat. No. 4,303,771.

This catalytic precursor has the formula $Mg_a Ti(OR)_b X_c (ED)_d$ wherein R is an aliphatic or aromatic hydrocarbon radical having 1 to 14 carbon atoms, or COR' wherein R' is an aliphatic or aromatic hydrocarbon radical having 1 to 14 carbon atoms; each OR group is the same or different; X is Cl, Br, or I, or mixtures thereof; ED is electron donor; a is 0.5 to 56; b is 0, 1 or 2; c is 2 to 116; and d is greater than $1.5a+2$;

A titanium compound, which may be used in the method for preparing the supported catalyst composition of the present invention may have the formula $Ti(OR)_a X_b$ wherein R and X are defined as for the catalytic precursor mentioned above; a is 0, 1, or 2; b is 1 to 4; a+b is 3 or 4. Suitable compounds are $TiCl_3$, $TiCl_4$, $Ti(OC_6H_5)Cl_3$, $Ti(OC_2H_5)Cl_3$, $Ti(OCOCH_3)Cl_3$ and $Ti(OCOC_6H_5)Cl_3$.

A magnesium compound useful in preparing the precursor may have the formula $MgX_2$ wherein X is defined as above. Suitable examples are $MgCl_2$, $MgBr_2$, and $MgI_2$. Anhydrous $MgCl_2$ is a preferred compound. About 0.5 to 56, and preferably about 1 to 10, moles of the magnesium compound are used per mole of titanium compound.

A suitable electron donor is an organic compound, which is liquid at temperatures in the range of about 0 □C. to 200 □C. It is also known as a Lewis base. The compounds used in the preparation of the catalyst precursor are soluble in the electron donor. The electron donor may be an alkyl ester of an aliphatic or aromatic carboxylic acid, an aliphatic ketone, an aliphatic amine, an aliphatic alcohol, an alkyl or a cycloalkyl ether, or mixture thereof, each electron donor having 2 to 20 carbon atoms. Among these electron donors alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms are preferred. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, ethyl propionate, hexyl ether, acetone, and methyl iso-butyl ketone.

The supports useful in the present invention are polymeric resins comprising oxygenated polymers wherein polyketones as well as hydrolyzed polyketones are the preferred ones. The supports have a particle size ranging between about 5 and 1000 microns and the preferred size range is between 50 and 80 microns. Furthermore, the supports have a particle pore volume of at least about 0.1 $cm^3/g$ as well as surface area of at least about 0.2 $cm^2$.

On the final catalyst composition the titanium loading is preferably between about 0.15 and 5% by weight, the magnesium loading is preferably between about 0.20 and 6% by weight, and the electron donor loading is preferably between 1 and 45% by weight.

The cocatalyst may comprise aluminum alkyls, aluminoxanes and/or mixtures thereof.

The polymer support may further comprise a chlorine containing polymer, such as polyvinyl chloride.

Some polymeric supports may be incompatible with some electron donors during catalyst preparation. Therefore, a unique method was devised for preventing the support from getting agglomerated or swelled when contacted with the electron donor. First, the support is dried in vacuum between 40 and 90° C., then slurried in hydrocarbon materials such as isopentane, hexane, heptane, or isooctane. The catalyst precursor solution, which contains the electron donor, is poured slowly on the support slurry and all materials are heated to 60° C. for from 15 minutes to 90 minutes. Mixing and stirring are employed continuously and constantly during the entire process. Washing with light hydrocarbon solvents, such as hexane and isopentane at the end of each batch preparation is an option sometimes used, and otherwise the composition is dried directly without washing. This is performed to compare catalyst activity and productivity utilizing both routes and for facilitating the catalyst scaling up process later on. In both ways, active catalyst batches are obtained and may be excellently utilized in a process for slurry polymerization of olefins according to the present invention.

Initially, catalysts batches are dried with a slow flow of nitrogen over night. Drying is later progressed to a vacuum drying to reduce lumps formation and to shorten cycle time of catalyst preparation. Vacuum drying is introduced after the majority of the liquid phase in the flask was evaporated. Catalyst drying time was varied with varying the desired amounts of tetrahydrofuran on the catalyst. The performance of the catalyst varies with varying tetrahydrofuran contents as well as with varying magnesium/titanium ratio.

The catalyst composition according to the present invention may be also used for copolymerization of ethylene with alpha-olefin selected from the group comprising 1-butene, 1-hexene, and 1-octene and mixtures thereof.

EXAMPLES

Example 1

Preparation of Catalyst Precursor

In a two-necked round bottom flask equipped with a condenser and a magnet stirrer, 2.0 grams of anhydrous magnesium chloride, 1.4 grams of titanium tetrachloride and 70 ml of THF were placed. The materials were heated to 60° C. and stirred for 90 minutes. A clear yellow solution was formed.

Example 2

Preparation of Catalyst Composition 2.1 grams of polyketone polymer were dried under vacuum at 60° C. for 30 minutes and placed in a two-necked round bottom flask. The polymer was slurried in hexane and catalyst precursor of Example 1 was added slowly to the polymer slurry. The temperature was raised to 60° C. and the materials were stirred and heated continuously for 30 minutes, then dried with nitrogen under vacuum. The yellow catalyst powder was analyzed and the composition comprised of Ti=2.85 wt %, Mg=5.0 wt % and THF=41.0 wt %.

Example 3

Catalyst Performance—Ethylene Homopolymerization using Catalyst Composition of Example 2

Ethylene polymerization was performed with catalyst composition of example 2 at 15 bars of ethylene including three bars of hydrogen partial pressure and triethylaluminum alkyl (TEAL) was used as the polymerization cocatalyst. The polymerization was run for one hour at a temperature of 85° C.

The polymerization run produced about 150 grams of homo-polyethylene resin with a catalyst productivity of 8.9 kg PE/g cat- hr and an activity of 313.2 kg PE/g Ti hr. The obtained polymer was a high-density polyethylene resin with a sieved bulk density equal to 0.236 g/cc.

Example 4

Preparation of Catalyst Precursor

In a two-necked round bottom flask equipped with a condenser and a magnet stirrer, 1.4 grams of anhydrous magnesium chloride, 1.4 grams of titanium tetrachloride and 70 ml of THF were placed. The materials were heated to 60° C. and stirred for 120 minutes. A clear yellow solution was formed.

Example 5

Preparation of Catalyst Composition 2.1 grams of hydrolyzed polyketone polymer was dried under vacuum at 80° C. for 30 minutes and placed in a two-necked round bottom flask. The polymer was slurried in hexane and catalyst precursor of Example 4 was added slowly to the polymer slurry. The temperature was raised to 60° C. and the materials were stirred and heated continuously for 30 minutes, then dried with nitrogen under vacuum. The yellow catalyst powder was analyzed and the composition comprised of Ti=4.2 wt %, Mg=4.0 wt % and THF=32.0 wt %.

Example 6

Catalyst Performance—Ethylene Homopolymerization using Catalyst Composition of Example 5

Ethylene polymerization was performed with catalyst composition of example 5 at 15 bars of ethylene including three bars of hydrogen partial pressure and triethylaluminum alkyl (TEAL) was used as the polymerization cocatalyst. The polymerization was run for one hour at a temperature of 85° C.

The polymerization run produced about 170 grams of homo-polyethylene resin with a catalyst productivity of 14.9 kg PE/g cat- hr and an activity of 354.9 kg PE/g Ti hr. The obtained polymer was a high-density polyethylene resin with a bulk density equal to 0.22 g/cc.

Example 7

Preparation of Catalyst Precursor

In a two-necked round bottom flask equipped with a condenser and a magnet stirrer, 1.4 grams of anhydrous magnesium chloride, 1.0 grams of titanium tetrachloride and 70 ml of THF were placed. The materials were heated to 60° C. and stirred for 120 minutes. A clear yellow solution was formed.

Example 8

Preparation of Catalyst Composition 2.1 grams of hydrolyzed polyketone polymer was dried under vacuum at 80° C. for 30 minutes and placed in a two-necked round bottom flask. The polymer was slurried in hexane and catalyst precursor of Example 7 was added slowly to the polymer slurry. The temperature was raised to 60° C. and the materials were stirred and heated continuously for 30 minutes, then dried with nitrogen under vacuum. The yellow catalyst powder was analyzed and the composition comprised of Ti=3.2 wt %, Mg=4.7 wt % and THF=38.0 wt %.

Example 9

Catalyst Performance—Ethylene Copolymerization using Catalyst Composition of Example 8

Ethylene co-polymerization with hexene was performed with catalyst composition of example 8 at 15 bars of ethylene including three bars of hydrogen partial pressure and triethylaluminum alkyl (TEAL) was used as the polymerization cocatalyst. The polymerization was run for one hour at a temperature of 85° C.

The polymerization run produced about 488 grams of polyethylene comonomer resin with a catalyst productivity of 9.9 kg PE/g cat- hr and an activity of 308.7 kg PE/g Ti hr. The obtained resin was a high-density polyethylene-hexene copolymer with a bulk density equal to 0.24 g/cc.

Example 10

Catalyst Performance—Ethylene Homopolymerization using Catalyst Composition of Example 8

Ethylene polymerization was performed with catalyst composition of example 8 at 15 bars of ethylene including three bars of hydrogen partial pressure and triethylaluminum alkyl (TEAL) was used as the polymerization cocatalyst. The reaction time left for one hour at a temperature of 85° C.

The polymerization run produced about 212 grams of homo-polyethylene resin with a catalyst productivity of 14.4 kg PE/g cat- hr and an activity of 448.9.7 kg PE/g Ti hr. The obtained polymer was a high-density polyethylene resin with a bulk density equal to 0.21 g/cc.

Example 11

Preparation of Catalyst Composition 3.0 grams of hydrolyzed polyketone polymer was dried under vacuum at 80° C. for 30 minutes and placed in a two-necked round bottom flask. The polymer was slurried in hexane and catalyst precursor of Example 1 was added slowly to the polymer slurry. The temperature was raised to 60° C. and the materials were stirred and heated continuously for 30 minutes, then dried with nitrogen under vacuum. The yellow catalyst powder was analyzed and the composition comprised of Ti=2.8 wt %, Mg=5.5 wt % and THF=44.5 wt %.

Example 12

Catalyst Performance—Ethylene Homopolymerization Catalyst Composition of Example 11

Ethylene polymerization was performed with catalyst composition of example 11 at 15 bars of ethylene including three bars of hydrogen partial pressure and triethylaluminum alkyl (TEAL) was used as the polymerization cocatalyst. The polymerization was run for one hour at a temperature of 85° C.

The polymerization run produced about 298 grams of homo-polyethylene resin with a catalyst productivity of 17.4 kg PE/g cat- hr and an activity of 622.1 kg PE/g Ti hr. The obtained polymer was a high-density polyethylene resin with a bulk density equal to 0.245 g/cc.

The features disclosed in the foregoing description and/or in the claims may, both separately and in any combination thereof, be material for realising the invention in diverse forms thereof.

The invention claimed is:

1. A supported catalyst composition for the homopolymerization of ethylene or the copolymerization of ethylene with alpha-olefins and/or diolefins consisting essentially of:
   (i) titanium tetrachloride, a magnesium compound and at least one electron donor compound;
   (ii) a polymer support comprised of a polyketone; and
   (iii) a cocatalyst comprised of at least one aluminum compound.

2. The supported catalyst composition of claim 1, wherein the magnesium compound is magnesium chloride.

3. The supported catalyst composition of claim 1, wherein the electron donor is tetrahydrofuran.

4. The supported catalyst composition of claim 2, wherein the electron donor is tetrahydrofuran.

5. The supported catalyst composition of claim 1, wherein the polymer support has a particle size between 5 and 1000 μm.

6. The supported catalyst composition of claim 4, wherein the polymer support has a particle size between 5 and 1000 μm.

7. The supported catalyst composition of claim 5, wherein the polymer support has a pore volume of at least about 0.1 $cm^3/g$.

8. The supported catalyst composition of claim 6, wherein the polymer support has a pore volume of at least about 0.1 $cm^3/g$.

9. The supported catalyst composition of claim 8, wherein the polymer support has a surface area is at least about 0.2 $m^2/g$.

10. The supported catalyst composition of claim 1, wherein the titanium loading on the catalyst composition is about 0.15% to about 5% by weight.

11. The supported catalyst composition according to claim 9, wherein the titanium loading on the catalyst composition is about 0.15% to about 5% by weight.

12. The supported catalyst composition according to claim 11, wherein the magnesium loading on the catalyst composition is about 0.20% to about 6% by weight.

13. The supported catalyst composition of claim 3, wherein the electron donor loading on the catalyst composition is about 1% to about 45% by weight.

14. The supported catalyst composition of claim 12, wherein the electron donor loading on the catalyst composition is from about 1% to about 45% by weight.

15. The supported catalyst composition of claim 1, wherein the cocatalyst comprises aluminum alkyls, aluminoxanes and/or mixtures thereof.

16. The supported catalyst composition of claim 14, wherein the cocatalyst comprises of aluminum alkyls, aluminoxanes and/or mixtures thereof.

17. The supported catalyst composition of claim 1, wherein the polymer support comprises a hydrolyzed polyketone.

18. The supported catalyst composition of claim 16, wherein the polymer support comprises a hydrolyzed polyketone.

19. A method for preparing the supported catalyst composition according to claim 1, comprising:
   (i) forming a catalytic precursor comprising a magnesium compound, titanium tetrachloride and at least one electron donor compound;
   (ii) mixing the catalytic precursor prepared in step (i) with a polymer support comprised of a polyketone in a hydrocarbon liquid;
   (iii) refluxing the mixture prepared in step (ii) to produce a refluxed product; and
   (iv) adding a cocatalyst comprising of at least one aluminum compound to the product of step (iii).

20. The method of claim 19, wherein the mixture of step (iii) is refluxed for about 15 to about 90 minutes.

21. The method of claim 20, wherein after refluxing said mixture in step (iii) the solvent is removed from said refluxed product by drying with nitrogen or applying a vacuum.

22. The method of claim 21, wherein the hydrocarbon liquid utilized in step (ii) is hexane, isooctane or isopentane.

23. The method of claim 19, wherein the polymer support comprises a hydrolyzed polyketone.

24. A process for homopolymerization of ethylene or copolymerization of ethylene with alpha-olefins and/or diolefins, comprising contacting ethylene or ethylene and alpha-olefins and/or diolefins with a catalyst composition consisting essentially of:
   (i) titanium tetrachloride, a magnesium compound and at least one electron donor compound;
   (ii) a polymer support comprised of a polyketone; and
   (iii) a cocatalyst comprised of at least one aluminum compound.

25. The process of claim 24, wherein ethylene is copolymerized with an alpha-olefin selected from the group comprising 1-butene, 1-hexene and 1-octene.

26. The process of claim 24, wherein the polymer support comprises a hydrolyzed polyketone.

* * * * *